(12) United States Patent
Hong

(10) Patent No.: US 11,834,735 B2
(45) Date of Patent: Dec. 5, 2023

(54) COPPER-ALLOY STAINLESS PIPE, AIR CONDITIONER INCLUDING THE SAME, AND METHOD OF MANUFACTURING THE SAME

(71) Applicant: LG ELECTRONICS INC., Seoul (KR)

(72) Inventor: Seokpyo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 852 days.

(21) Appl. No.: 16/395,106

(22) Filed: Apr. 25, 2019

(65) Prior Publication Data

US 2020/0198065 A1    Jun. 25, 2020

(30) Foreign Application Priority Data

Dec. 19, 2018 (KR) .................. 10-2018-0164975

(51) Int. Cl.
  *B23K 35/30*    (2006.01)
  *C21D 9/08*     (2006.01)
  (Continued)

(52) U.S. Cl.
  CPC ............ *C22C 38/58* (2013.01); *B23K 35/302* (2013.01); *C21D 9/08* (2013.01); *C22C 38/001* (2013.01);
  (Continued)

(58) Field of Classification Search
  CPC .. B23K 1/19; B23K 2101/04; B23K 2101/06; B23K 2101/34; B23K 2103/04;
  (Continued)

(56) References Cited

U.S. PATENT DOCUMENTS 6,135,160 A * 10/2000 Sugao ............... B23K 31/02
                                             138/143
2018/0106557 A1* 4/2018 Hong ................ C21D 8/0226

FOREIGN PATENT DOCUMENTS

CN       1343536 A     4/2002
CN      103255453      8/2013
(Continued)

OTHER PUBLICATIONS

Effect of solution treatment conditions on the sensitization of austenitic stainless steel Xiaofei Yu, Shenhao Chen, and Liang Wang J. Serb. Chem. Soc. 74 (11) 1293-1302 (2009) (Year: 2009).*

(Continued)

*Primary Examiner* — Jenny R Wu
(74) *Attorney, Agent, or Firm* — Bryan Cave Leighton Paisner LLP

(57) ABSTRACT

Disclosed herein are a copper-alloy stainless pipe, an air conditioner including the same and a method of manufacturing the same. A copper-alloy stainless pipe includes a recrystallization layer forming an interface between a pipe base material and a copper plating layer, thereby increasing bonding force between the pipe base material and the copper plating layer. Accordingly, it is possible to prevent the copper plating layer from being peeled off and to increase corrosion resistance of the pipe. The recrystallization layer may be composed of intermetallic compound.

13 Claims, 14 Drawing Sheets

(7 of 14 Drawing Sheet(s) Filed in Color)

(51) Int. Cl.

| | |
|---|---|
| *C22C 38/44* | (2006.01) |
| *C22C 38/00* | (2006.01) |
| *C22C 38/58* | (2006.01) |
| *C22C 38/42* | (2006.01) |
| *C22C 38/02* | (2006.01) |
| *F25B 41/40* | (2021.01) |
| *B23K 101/34* | (2006.01) |
| *B23K 103/22* | (2006.01) |
| *B23K 101/04* | (2006.01) |
| *B23K 1/19* | (2006.01) |
| *F25B 45/00* | (2006.01) |
| *F25B 41/42* | (2021.01) |

(52) U.S. Cl.
CPC ............. *C22C 38/02* (2013.01); *C22C 38/42* (2013.01); *C22C 38/44* (2013.01); *F25B 41/40* (2021.01); *B23K 1/19* (2013.01); *B23K 2101/04* (2018.08); *B23K 2101/34* (2018.08); *B23K 2103/22* (2018.08); *F25B 41/42* (2021.01); *F25B 45/00* (2013.01)

(58) Field of Classification Search
CPC ............. B23K 2103/22; B23K 35/302; B32B 15/013; B32B 15/015; C21D 1/26; C21D 2211/001; C21D 2211/005; C21D 2251/00; C21D 6/004; C21D 9/08; C22C 38/00; C22C 38/001; C22C 38/02; C22C 38/42; C22C 38/44; C22C 38/58; C22F 1/08; C25D 5/50; C25D 7/04; F25B 13/00; F25B 41/40; F25B 41/42; F25B 45/00

See application file for complete search history.

(56) References Cited

FOREIGN PATENT DOCUMENTS

| | | | | |
|---|---|---|---|---|
| CN | 206555592 | U | 10/2017 | |
| CN | 108200771 | A | 6/2018 | |
| EP | 3301199 | A1 | 4/2018 | |
| JP | 53-37125 | A | 4/1978 | |
| JP | 63-37125 | A | 4/1978 | |
| JP | S5337125 | A * | 4/1978 | |
| JP | 05-033103 | A | 2/1993 | |
| JP | 11-229084 | A | 8/1999 | |
| JP | 2001-074344 | A | 3/2001 | |
| JP | 2005-235460 | A | 9/2005 | |
| JP | 2005-325856 | A | 11/2005 | |
| JP | 2009299182 | A * | 12/2009 | ........... B23K 35/302 |
| JP | 2017-509790 | A | 4/2017 | |
| KR | 10-1995-0003462 | A | 2/1995 | |
| KR | 20-0399516 | Y1 | 10/2005 | |
| KR | 10-1568536 | B1 | 11/2015 | |
| KR | 10-1827577 | B1 | 2/2018 | |
| KR | 10-2018-0086747 | A | 8/2018 | |
| KR | 10-2018-0111416 | A | 10/2018 | |
| WO | 2008/134958 | A1 | 11/2008 | |
| WO | WO-2017171178 | A1 * | 10/2017 | ............. C21D 6/004 |

OTHER PUBLICATIONS

Brazing copper with Stainless steel Vacuum Furnace (Year: 2017).*
Brazing of copper to stainless steel with a lowsilver-content brazing filler metal Tatsuya Fukikoshi IOP Conf. Ser.: Mater. Sci. Eng. 61 012016 (Year: 2014).*

* cited by examiner

COPPER-ALLOY STAINLESS PIPE, AIR CONDITIONER INCLUDING THE SAME, AND METHOD OF MANUFACTURING THE SAME

CROSS-REFERENCE TO RELATED APPLICATION

The present application claims priority under 35 U.S.C. 119 and 35 U.S.C. 365 to Korean Patent Application No. 10-2018-0164975, filed on Dec. 19, 2018, which is hereby incorporated by reference in its entirety.

BACKGROUND OF THE INVENTION

1. Field of the Invention

The present invention relates to a copper-alloy stainless pipe, an air conditioner including the same and a method of manufacturing the same.

2. Discussion of the Related Art

An air conditioner may be defined as a device for supplying warm air or cold air to a room using a phase change cycle of refrigerant.

Specifically, the phase change cycle of the refrigerant includes a compressor for compressing low-temperature low-pressure gaseous refrigerant into high-temperature high-pressure gaseous refrigerant, a condenser for phase-changing high-temperature high-pressure gaseous refrigerant compressed by the compressor to high-temperature high-pressure liquid refrigerant, an expansion valve for expanding the high-temperature high-pressure liquid refrigerant passing through the condenser to low-temperature low-pressure two-phase refrigerant, and an evaporator for phase-changing the low-temperature low-voltage two-phase refrigerant passing through the expansion valve to low-temperature low-pressure gaseous refrigerant.

If the phase change cycle of the refrigerant operates as a device for supplying cold air, the condenser is placed outdoors and the evaporator is placed indoors. In addition, the compressor, the condenser, the expansion valve and the evaporator are connected by a refrigerant pipe, thereby configuring a refrigerant circulation closed-circuit.

As the refrigerant pipe, a copper (Cu) pipe is widely used. However, the copper pipe have several problems.

First, if the copper pipe is used in a total heat exchanger using water as refrigerant, scales are accumulated on the inner circumferential surface of the pipe, which may adversely affect reliability of the pipe. That is, when the scales are accumulated on the inner circumferential surface of the copper pipe, it is necessary to perform cleaning operation of washing the inner circumferential surface of the pipe or pipe replacement operation.

Second, the copper pipe cannot withstand high pressure, that is, does not have sufficient pressure-resistant characteristics. In particular, if the copper pipe is applied to a refrigerant circulation cycle, to which refrigerant compressed to high-pressure refrigerant by a compressor, for example, new refrigerant such as R410a, R22 or R32, is applied, the copper pipe may be damaged by high pressure as the operation time of the refrigerant cycle increases.

In addition, since the price of copper is relatively high and is significantly changed in the market, it is difficult to use the copper pipe.

In order to solve such problems, recently, stainless steel pipes have emerged as a new means capable of replacing cooper pipes.

The stainless steel pipe is made of stainless steel, has stronger corrosion resistance than the copper pipe and is cheaper than the copper pipe. In addition, the stainless steel pipe has greater strength and hardness than the copper pipe and thus has more excellent vibration and noise absorption ability than the copper pipe.

In addition, the stainless steel pipe has better pressure-resistance characteristics than the copper pipe and thus may not be damaged by high pressure.

Accordingly, some of the pipes used in an air conditioner are stainless steel pipes and the stainless steel pipes may be bonded to the copper pipes using a copper connector through welding. However, if the copper connector is used, the copper connector may be separated from the stainless steel pipe or the copper pipe due to vibration occurring during operation of the air conditioner.

In order to solve this, a method of plating the surface of the stainless steel pipe with copper may be considered. However, when the surface of the stainless steel pipe is plated with copper, since copper is only ion-bonded to the surface of the stainless steel pipe, the copper may be easily peeled off.

PRIOR ART

Patent Document

Korean Registered Patent No. 10-1827577 (Feb. 2, 2018)

SUMMARY OF THE INVENTION

An object of the present invention is to provide a copper-alloy stainless pipe capable of stably bonding a copper plating layer to a surface of a base material composed of a stainless steel pipe.

In particular, another object of the present invention is to provide a copper-alloy stainless pipe capable of preventing a plating layer from being peeled off by forming a recrystallization layer between the plating layer and a surface of a base material through heat treatment after the surface of the base material is plated with copper.

In addition, another object of the present invention is to provide a copper-alloy stainless pipe capable of determining a heat treatment temperature for preventing intergranular corrosion of a stainless steel pipe and performing heat treatment at the determined heat treatment temperature.

In addition, another object of the present invention is to provide a copper-alloy stainless pipe using, as a base material, a ductile stainless steel pipe having improved processability by securing the same ductility as a copper pipe.

In addition, another object of the present invention is to provide a copper-alloy stainless pipe using a stainless steel pipe having strength and hardness equal to or higher than those of a copper pipe as a base material.

To achieve the above objects, a copper-alloy stainless pipe according to an embodiment includes a recrystallization layer forming an interface between a pipe base material and a copper plating layer, thereby increasing bonding force between the pipe base material and the copper plating layer. Accordingly, it is possible to prevent the copper plating layer from being peeled off and to increase corrosion resistance of the pipe.

The recrystallization layer may be composed of intermetallic compound.

The intermetallic compound may include at least copper (Cu), chromium (Cr), iron (Fe) and nickel (Ni).

The recrystallization layer may configure a diffusion layer in which a metal composition diffuses from the pipe base material toward the copper plating layer in a radial direction.

The weight percent of chromium (Cr), iron (Fe) and nickel (Ni) in the recrystallization layer may linearly decrease from the pipe base material toward the copper plating layer.

A weight percent of copper (Cu) in the recrystallization layer may linearly increase from the pipe base material toward the copper plating layer.

A thickness of the recrystallization layer in a radial direction may be 0.18 to 0.22 μm.

The copper plating layer may include a copper cyanide plating layer or a copper sulfate plating layer.

The recrystallization layer may be formed by performing heat treatment in a state in which the copper plating layer is provided on the pipe base material.

An air conditioner according to another aspect includes a suction pipe and a discharge pipe. The suction pipe or the discharge pipe is configured by welding a copper-alloy stainless pipe and a copper pipe, thereby easily connecting the pipes.

The copper-alloy stainless pipe and the copper pipe may be brazing-welded.

The copper-alloy stainless pipe may be bonded to the inside of the copper pipe, and a welding portion may be formed between the copper-alloy stainless pipe and the copper pipe.

A method of manufacturing an air conditioner including a refrigerant pipe according to another embodiment includes plating an outer surface of a pipe base material composed of stainless steel with copper to form a copper plating layer, and performing heat treatment with respect to the pipe base material and the copper plating layer to form a recrystallization layer between the pipe base material and the copper plating layer and manufacturing a copper-alloy stainless pipe.

The method may further include welding the copper-alloy stainless pipe and the copper pipe to configure the refrigerant pipe.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE PREFERRED EMBODIMENTS

Exemplary embodiments of the present invention will be described below in detail with reference to the accompanying drawings in which the same reference numbers are used throughout this specification to refer to the same or like parts. In describing the present invention, a detailed description of known functions and configurations will be omitted when it may obscure the subject matter of the present invention.

It will be understood that, although the terms first, second, A, B, (a), (b), etc. may be used herein to describe various elements of the present invention, these terms are only used to distinguish one element from another element and essential, order, or sequence of corresponding elements are not limited by these terms. It will be understood that when one element is referred to as being "connected to", "coupled to", or "accessed to" another element, one element may be "connected to", "coupled to", or "accessed to" another element via a further element although one element may be directly connected to or directly accessed to another element.

Figure 1:
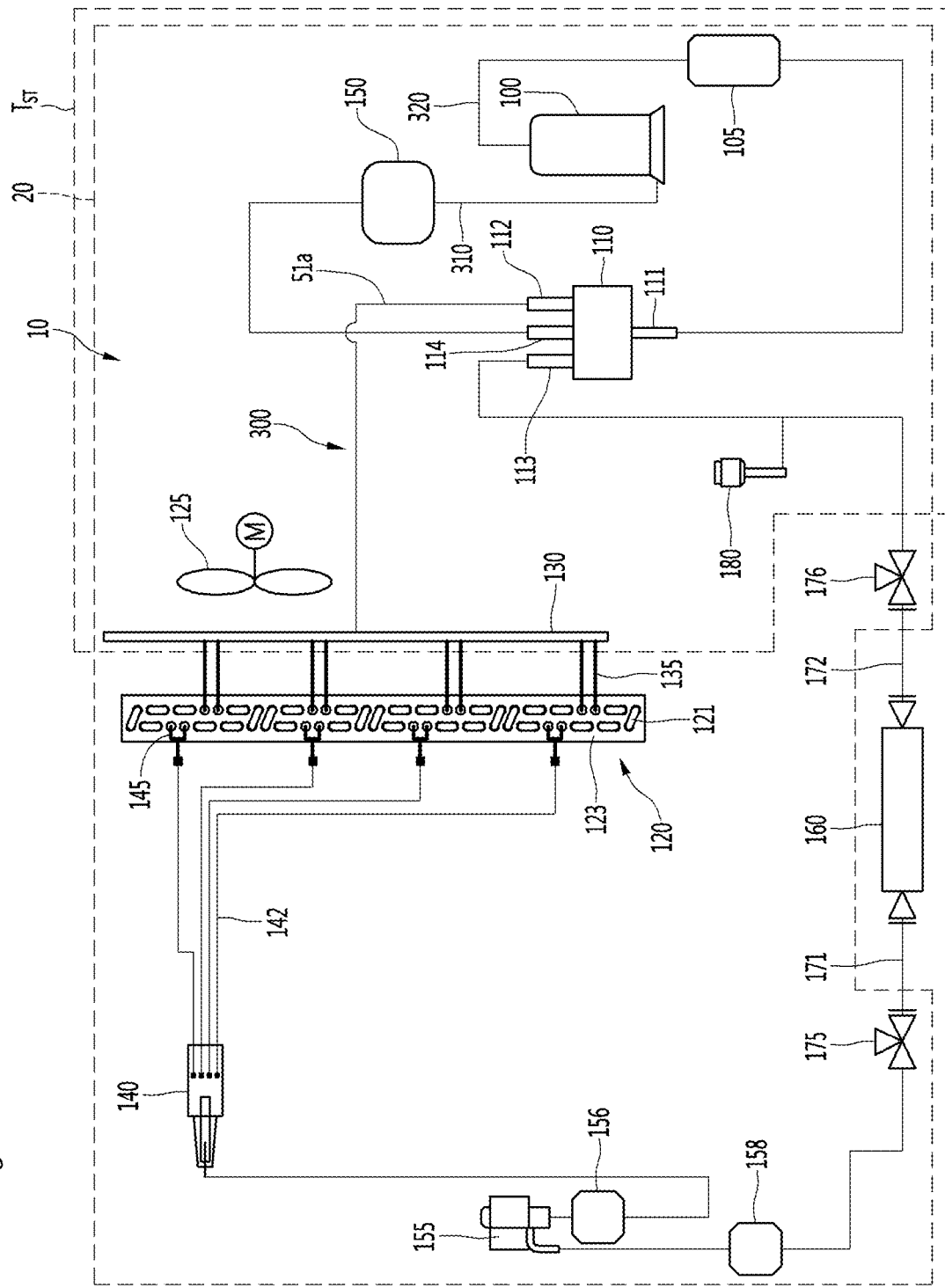
FIG. 1 is a diagram illustrating a refrigeration cycle showing the configuration of an air conditioner according to an embodiment of the present invention.

FIG. 1 is a diagram illustrating a refrigeration cycle showing the configuration of an air conditioner according to an embodiment of the present invention.

Referring to FIG. 1, the air conditioner 10 according to the embodiment of the present invention includes an outdoor unit 20 and an indoor unit 160 in order to operate a refrigerant cycle in which refrigerant is circulated.

The outdoor unit 20 further includes a compressor 100 for compressing refrigerant into high-pressure refrigerant and a muffler 105 disposed on the outlet side of the compressor 100. The muffler 105 may reduce noise generated in the high-pressure refrigerant discharged from the compressor 100.

The outdoor unit 20 further includes a flow control valve 110 disposed on the outlet side of the muffler 105 to change the flow direction of the refrigerant compressed by the compressor 100. For example, the flow control valve 110 may include a four-way valve. Specifically, the flow control valve 110 includes a first port 111, through which the high-pressure refrigerant compressed by the compressor 110 is introduced, a second port 112 connected to a pipe extending from the flow control valve 110 to an outdoor heat exchanger side, a third port 113 connected to a pipe extending from the flow control valve 110 to the indoor unit 160, and a fourth port 114 connected to a pipe extending from the flow control valve 110 to the compressor 100.

The outdoor unit 20 further includes an outdoor heat exchanger 120 for exchanging heat with outside air. The outdoor heat exchanger 120 is disposed on the outlet side of the flow control valve 110. In addition, the outdoor heat exchanger 120 includes a heat exchange pipe 121 and a holder 123 supporting the heat exchange pipe 121. An outdoor fan 125 for blowing outside air to the outdoor heat exchanger 120 is further provided on one side of the outdoor heat exchanger 120.

The outdoor unit 20 includes a manifold 130 connected to the second port 112 of the flow control valve 110 and a plurality of connection pipes 135 extending from the manifold 130 to the outdoor heat exchanger 120.

The outdoor unit 20 further includes a distributor 140 provided on one side of the outdoor heat exchanger 120 and a plurality of capillaries 142 extending from the distributor 140 to the outdoor heat exchanger 120. Each capillary 142 may be connected to a branch pipe 145 coupled to the outdoor heat exchanger 120.

The outdoor unit 20 further includes a main expansion device 155 for depressurizing the refrigerant condensed in the indoor unit 160 and strainers 156 and 158 provided on one side of the expansion device 155 to separate foreign materials from the refrigerant.

The outdoor unit 20 further includes service valves 175 and 176, to which connection pipes 171 and 172 are connected when the outdoor unit assembled with the indoor unit 160. The connection pipes 171 and 172 may be understood as pipes for connecting the outdoor unit 20 with the indoor unit 160. The service valves 175 and 176 include a first service valve 175 provided on one side of the outdoor unit 20 and a second service valve 176 provided on the other side of the outdoor unit 20.

In addition, the connection pipes 171 and 172 include a first connection pipe 171 extending from the first service valve 175 to the indoor unit 160 and a second connection pipe 172 extending from the second service valve 176 to the indoor unit 160.

The outdoor unit 20 further includes a pressure sensor 180. The pressure sensor 180 may be installed on a refrigerant pipe extending from the third port 113 of the flow control valve 110 to the second service valve 176. During cooling operation, the pressure sensor 180 may sense the pressure, that is, low pressure, of the refrigerant evaporated in the indoor unit 160. In contrast, the pressure sensor 180 may sense the pressure, that is, high pressure, of the refrigerant compressed in the compressor 100.

The outdoor unit 20 further includes a gas-liquid separator 150 disposed on the inlet of the compressor 100 to separate gaseous refrigerant from the evaporated low-pressure refrigerant and to provide the gaseous refrigerant to the compressor 100.

The indoor unit 160 includes an indoor heat exchanger (not shown) and an indoor fan provided on one side of the indoor heat exchanger to blow indoor air. The indoor unit 160 may further include an indoor expansion device for depressurizing the condensed refrigerant during cooling operation. The refrigerant depressurized in the indoor expansion device may be evaporated in the indoor heat exchanger. The indoor unit 160 may be connected to the outdoor unit 20 through the first and second connection pipes 171 and 172.

The outdoor unit 20 further includes a refrigerant pipe 300 for connecting a plurality of components of the outdoor unit 20. The refrigerant pipe 300 may be composed of a copper-alloy stainless pipe.

For example, the copper-alloy stainless pipe is applicable to the refrigerant pipe around the compressor 100. That is, the copper-alloy stainless pipe is applicable to a position where the copper connector may be separated by vibration and stress occurring in the compressor 100.

Specifically, the copper-alloy stainless pipe is applicable to a suction pipe 310 extending from the fourth port 114 of the flow control valve 110 to the compressor 100. In addition, the copper-alloy stainless pipe is applicable to a discharge pipe 320 extending from the compressor 100 to the first port 111 of the flow control valve 110.

The copper-alloy stainless pipe is applicable to a pipe extending from the second port 112 of the flow control valve 110 to the manifold 130. In addition, the copper-alloy stainless pipe is applicable to a pipe extending from the third port 113 of the flow control valve 110 to the second service valve 176.

The region of the refrigerant pipe, to which the copper-alloy stainless pipe is applied, is denoted by $T_{ST}$ in FIG. 1.

Figure 2:
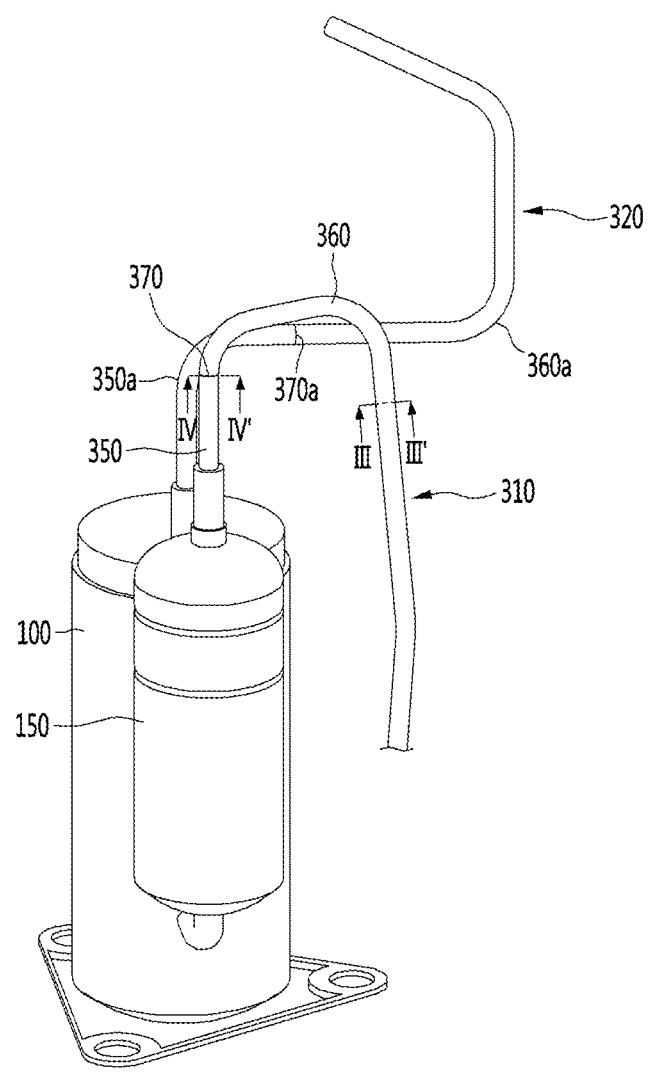
FIG. 2 is a diagram showing the configuration of a pipe structure around a compressor according to an embodiment of the present invention.
Figure 3:
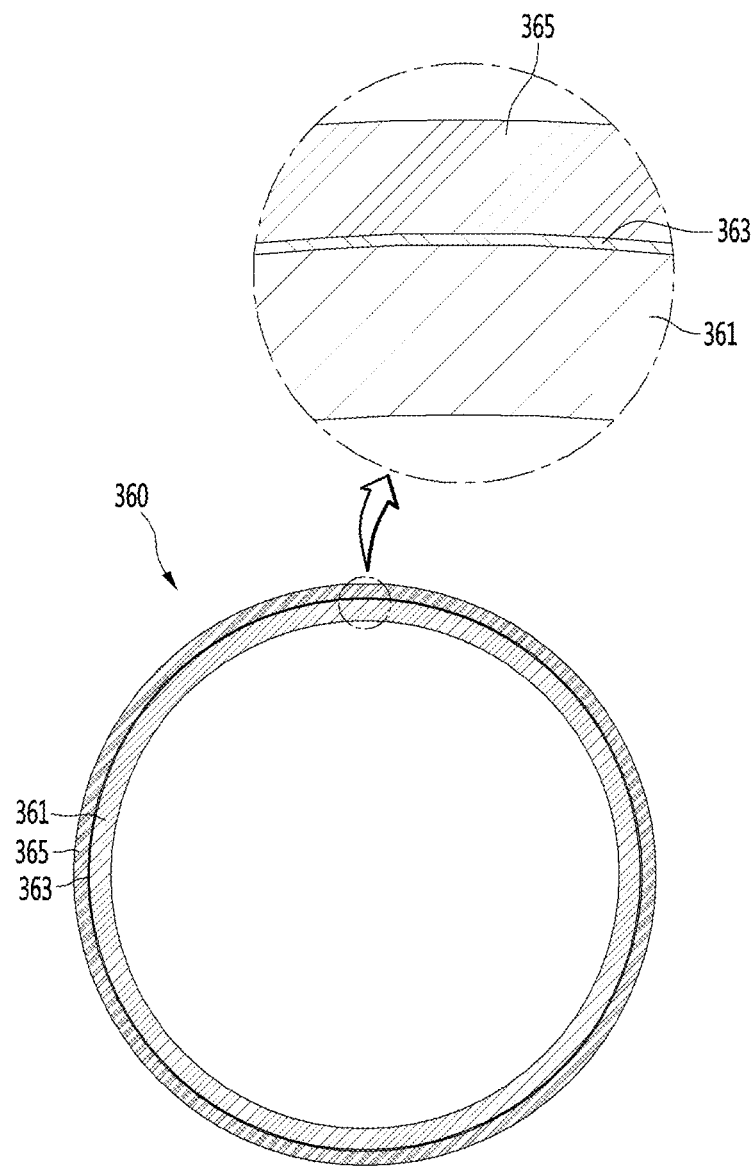
FIG. 3 is a cross-sectional view taken along line III-III' of FIG. 2.
Figure 4:
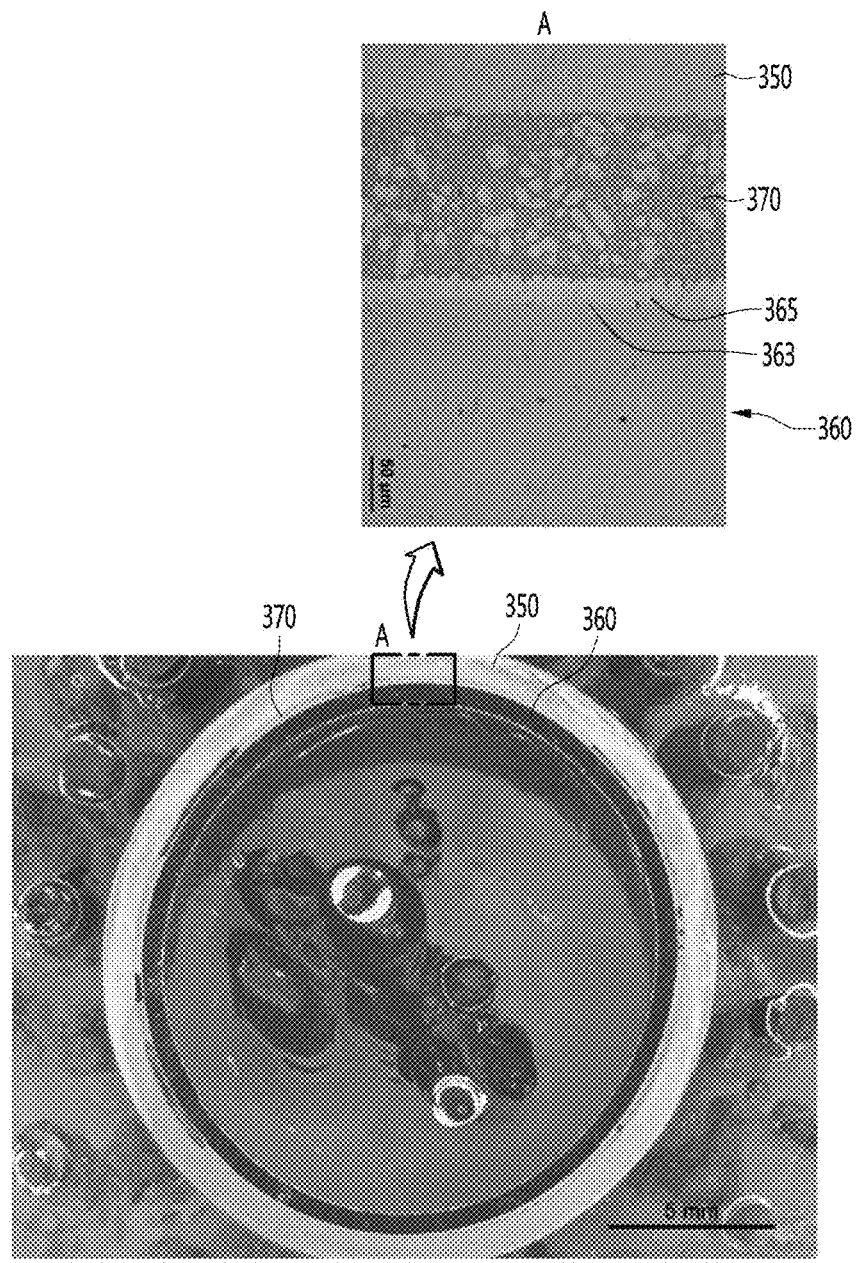
FIG. 4 is a cross-sectional view taken along line IV-IV' of FIG. 2.

FIG. 2 is a diagram showing the configuration of a pipe structure around a compressor according to an embodiment of the present invention, FIG. 3 is a cross-sectional view taken along line III-III' of FIG. 2, and FIG. 4 is a cross-sectional view taken along line IV-IV' of FIG. 2.

Referring to FIG. 2, a copper-alloy stainless pipe 360 according to an embodiment of the present invention may be provided on the suction pipe 310 and the discharge pipe 320 of the compressor 100. Specifically, the suction pipe 310 includes a copper pipe 350 connected to the gas-liquid separator 150 and the copper-alloy stainless pipe 360 bonded to the copper pipe 350.

The copper pipe 350 and the copper-alloy stainless pipe 360 may be bonded through welding. Accordingly, a welding portion 370 is formed between the copper pipe 350 and the copper-alloy stainless pipe 360. For example, welding may include brazing welding.

In addition, the discharge pipe 320 includes a copper pipe 350a connected to the compressor 100 and a copper-alloy stainless pipe 360a bonded to the copper pipe 350a. Similarly, the welding portion 370 formed through brazing welding is provided between the copper pipe 350a and the copper-alloy stainless pipe 360a.

Referring to FIG. 3, the copper-alloy stainless pipe 360 according to the embodiment of the present invention includes a pipe base material 361 composed of a ductile stainless steel pipe and a copper plating layer 365 formed on a surface of the pipe base material 361.

In addition, the copper-alloy stainless pipe 360 further includes a recrystallization layer 363 formed through heat treatment of the pipe base material 361 and the copper plating layer 365. The recrystallization layer 363 may be understood as a layer in which a new interface is formed by generating and growing a crystal nucleus in a boundary between the pipe base material 361 and the copper plating layer 365 by heat treatment.

That is, the recrystallization layer 363 is a layer in which, by heat treatment of the pipe base material 361 and the coper plating layer 365, metal diffuses to achieve recrystallization, and may be composed of an intermetallic compound.

The configuration of the pipe base material, that is, ductile stainless steel pipe, will now be described.

The ductile stainless steel pipe may be composed of a stainless material and a material having impurities including at least copper (Cu). The new-material pipe has higher strength than a copper (Cu) pipe and has better processability than a stainless steel pipe.

The ductile stainless steel has lower strength and hardness than the conventional stainless steel, but has a better bending property. The ductile stainless steel pipe according to the embodiment of the present invention has lower strength and hardness than the conventional stainless steel, but has strength and hardness equal to or higher than those of the copper pipe and has a bending property similar to that of the cooper pipe, thereby having a better flexing property. Bending and flexing have the same meaning.

As a result, since the strength of the ductile stainless steel is higher than that of the copper pipe, the possibility of damaging the pipe may be reduced. Accordingly, the number of types of refrigerant which may be selected in the air conditioner 10 may increase.

Hereinafter, the constituent elements defining the characteristics of the ductile stainless steel according to the embodiment of the present invention will be described. It is noted that the composition ratio of the constituent element described below is a weight percent (wt. %).

1. Composition of Stainless Steel (1) Carbon (C): 0.3% or less

The stainless steel according to the embodiment of the present invention includes carbon C and chromium Cr. Carbon reacts with chromium to precipitate chromium carbide. In this case, chromium is depleted at or around a grain boundary, thereby causing corrosion. Accordingly, the amount of carbon is preferably small.

Carbon is coupled with other elements to increase creep strength. If the content of carbon exceeds 0.03%, ductility may deteriorate. Accordingly, in the present invention, the content of carbon is set to 0.03% or less.

(2) Silicon (Si): greater than 0 to 1.7% or less

An austenite structure has lower yield strength than a ferrite structure or a martensite structure. Accordingly, in order for the ductile stainless steel of the present invention to have bending (bending freedom degree) equal or similar to that of copper, the matrix structure of stainless steel is preferably made of austenite.

However, since silicon is an element forming ferrite, as the content of silicon increases, the ratio of the ferrite in the matrix structure increases and stability of the ferrite increases. The content of silicon is preferably as low as possible. However, it is impossible to completely prevent introduction of silicon as impurities in a manufacturing process.

If the content of silicon exceeds 1.7%, it is difficult for the stainless steel to have ductility similar to that of the copper material and to secure sufficient processability. Accordingly, the content of silicon included in the stainless steel according to the embodiment of the present invention is set to 1.7% or less.

(3) Manganese (Mn): 1.5 to 3.5%

Manganese serves to suppress phase transformation of the matrix structure of the stainless steel into a martensitic type and to expand an austenite zone to achieve stability. If the content of manganese is less than 1.5%, the effect of suppressing phase transformation by manganese is not sufficient. Accordingly, in order to sufficiently obtain the effect of suppressing phase transformation by manganese, the lower limit of the content of manganese is set to 1.5%.

However, as the content of manganese increases, the yield strength of the stainless steel increases, thereby deteriorating ductility of the stainless steel. Therefore, the upper limit of the content of manganese is set to 3.5%.

(4) Chromium (Cr): 15 to 18%

Chromium is an element which improves corrosion initiation resistance of stainless steel. Corrosion initiation means that corrosion first occurs in a base material, and corrosion initiation resistance means a property of suppressing corrosion from first occurring in a base material. This may be interpreted to have the same meaning as corrosion resistance.

If the content of chromium is less than 15.0%, the stainless steel does not have sufficient corrosion initiation resistance (or corrosion resistance). Therefore, in the present invention, the lower limit of the content of chromium is set to 15.0%.

In contrast, if the content of chromium is excessively high, a ferrite structure is formed at a room temperature and ductility is decreased. In particular, stability of austenite is lost at a high temperature and strength is lowered due to bromination. Accordingly, in the present invention, the upper limit of the content of chromium is set to 18.0%.

(5) Nickel (Ni): 7.0 to 9.0%

Nickel has properties of improving corrosion growth resistance of stainless steel and stabilizing an austenite structure.

Corrosion growth means that corrosion, which has already occurred in a base material, is grown over a wide range, and corrosion growth resistance means a property of suppressing corrosion growth.

If the content of nickel is less than 7.0%, the stainless steel does not have sufficient corrosion growth resistance. Therefore, in the present invention, the lower limit of the content of nickel is set to 7.0%.

In addition, if the content of nickel is excessively high, since the strength and hardness of stainless steel increase, it is difficult to secure sufficient processability of the stainless steel. In addition, since cost increases, which is not desirable from the economical point of view. Accordingly, in the present invention, the upper limit of the content of nickel is set to 9.0%.

(6) Copper (Cu): 1.0 to 4.0%

Copper serves to suppress phase transformation of the matrix structure of stainless steel into a martensite structure, thereby increasing ductility of stainless steel. If the content of copper is less than 1.0%, the effect of suppressing phase transformation by copper is not sufficient. Accordingly, in the present invention, in order to sufficiently obtain the effect of suppressing phase transformation by copper, the lower limit of the content of copper is set to 1.0%.

In particular, in order for stainless steel to have a bending property equal or similar to that of copper, the content of copper should be 1.0% or more.

As the content of copper increases, the effect of suppressing phase transformation of the matrix structure increases and the increase width thereof gradually decreases. If the content of copper exceeds 4 to 4.5%, the effect is saturated to generate martensite, which is not preferable. Copper is expensive, thereby adversely affecting economic efficiency. Accordingly, by setting the upper limit of the content of copper to 4.0%, it is possible to maintain the effect of suppressing phase transformation of copper below a saturation level and to secure economic efficiency.

(7) Molybdenum (Mo): 0.03% or less (8) Phosphorus (P): 0.04% or less (9) Sulfur (S): 0.04% or less

(10) Nitrogen (N): 0.03% or less

Molybdenum, phosphorus, sulfur and nitrogen are contained in originally self-finished products of steel to cure stainless steel and thus the content thereof is preferably as low as possible.

2. Matrix Structure of Stainless Steel

The matrix structure of the ductile stainless steel may be composed of austenite type stainless steel mainly composed of chromium (18%) and nickel (8%) and ferrite type stainless steel mainly composed of chromium (18%).

If the matrix structure of the ductile stainless steel is composed of austenite type stainless steel, delta ferrite δ-Ferrite may be further included. For example, the ductile stainless steel may have an austenite matrix structure of 90% or more, and preferably 99% or more, and a delta ferrite matrix structure of 1% or less, based on the grain size area.

The copper plating layer 365 may be composed of copper cyanide or copper sulfate. The thickness of the copper plating layer 365 in a radial direction may be in a range of 3 μm to 30 μm. Although the thickness of the copper plating layer is generally 3 μm to 5 μm, the copper plating layer 365 according to the present embodiment has a thickness capable of re-welding at least five times.

That is, even when the copper-alloy stainless pipe is bonded to the copper pipe, is separated and then is re-welded, the copper plating layer 365 may remain.

The recrystallization layer 363 may be configured by forming the copper plating layer 365 on the pipe base material 361 and then performing heat treatment. When the pipe base material 361 is coated with the copper plating layer 365, only ion bonding is performed and thus bonding force is weak. Accordingly, when predetermined external force or a heat source is applied to the pipe base material 361, the copper plating layer 365 may be peeled off.

Accordingly, when the copper plating layer 365 is formed on the pipe base material 361 and then is welded to the copper pipe 350 without heat treatment, the possibility of damaging the copper plating layer 365 is increased.

In order to prevent this, in the present embodiment, recrystallization is achieved at the boundary between the pipe base material 361 and the copper plating layer 365, thereby forming the recrystallization layer 363 forming a predetermined interface.

The heat treatment condition is as follows.

If the matrix structure of the pipe base material 361 is of austenite type, the heat treatment temperature may be in a range of 850° C. to 1,083° C.

In the case of the austenite type matrix structure, since a sensitizing temperature range causing intergranular corrosion is in a range of 550° C. to 850° C. Therefore, if the austenite type matrix structure is exposed to the sensitizing temperature range for a long time, chromium carbide is formed and thus intergranular corrosion occurs. Here, intergranular corrosion may be understood as a local corrosion phenomenon intensively occurring in the grain boundary of an alloy.

Accordingly, the heat treatment temperature for preventing intergranular corrosion and recrystallizing the pipe base material needs to be 850° C. or more. In addition, since the melting point of copper (Cu) is 1,083° C., the heat treatment temperature needs to be less than the melting point of copper.

Meanwhile, if the matrix structure of the pipe base material 361 is of ferrite type, the sensitizing temperature range causing intergranular corrosion is about 900° C. or more. If the heat treatment temperature is less than 800° C., recrystallization of the pipe base material 361 may not be easy. Accordingly, the heat treatment may be in a range of 800° C. to 900° C.

If the pipe base material 361 of the ferrite type is subjected to heat treatment at a temperature of 900° C. or more, slow cooling is performed at a predetermined rate or less, thereby preventing chromium carbide from being precipitated due to the sensitizing temperature.

Referring to FIG. 4, the copper pipe 350 and the copper-alloy stainless pipe 360 may be bonded to each other through welding. For example, the copper-alloy stainless pipe 360 is inserted into the copper pipe 350, and the welding portion 370 is formed between the outer circumferential surface of the copper-alloy stainless pipe 360 and the inner circumferential surface of the copper pipe 350.

For example, brazing welding is performed as a welding method, and the welding portion 370 may include filler metal melted in the welding process and configured as a part of a welded material.

The copper-alloy stainless pipe 360 includes the pipe base material 361, the copper plating layer 365 formed outside the pipe base material 361, and the recrystallization layer 363 forming the interface between the pipe base material 361 and the copper plating layer 365.

Figure 5:
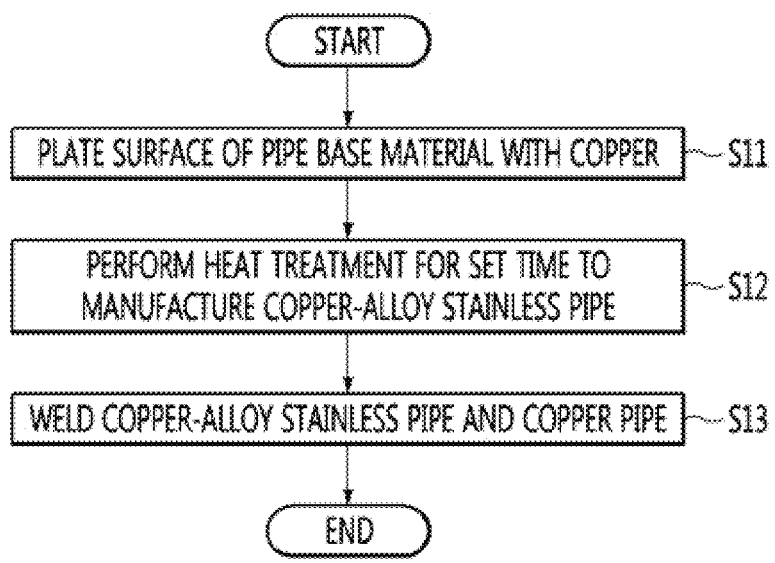
FIG. 5 is a flowchart illustrating a process of manufacturing and welding a copper-alloy stainless pipe to a copper alloy according to an embodiment of the present invention.

FIG. 5 is a flowchart illustrating a process of manufacturing and welding a copper-alloy stainless pipe to a copper alloy according to an embodiment of the present invention.

Referring to FIG. 5, the outer circumferential surface of the pipe base material 361 is plated with copper to form the copper plating layer 365. As described above, the pipe base material 361 may be composed of "ductile stainless steel" (S11).

Heat treatment is performed with respect to the pipe base material 361 during a set time to perform the recrystallization process of the pipe base material 361 and the copper plating layer 365, and the recrystallization layer 363 is formed between the pipe base material 361 and the copper plating layer 365.

The recrystallization layer 363 is an interface between the pipe base material 361 and the copper plating layer 365 and may be understood as an "alloy layer" or a "diffusion layer". By this method, the copper-alloy stainless pipe 360 may be manufactured.

In addition, the set time may be 10 to 20 minutes.

The heat treatment temperature may be in a range of 850° C. to 1,083° C. in the case of the pipe base material 361 composed of stainless steel of the austenite type matrix structure. In contrast, the heat treatment temperature may be in a range of 800° C. to 900° C. in the case of the pipe base material 361 composed of stainless steel of the ferrite type matrix structure.

Meanwhile, if heat treatment is performed at a temperature of 900° C. or more with respect to the pipe base material 361 composed of stainless steel of the ferrite type matrix structure, slow cooling may be performed at a predetermined rate or less (S12).

The copper-alloy stainless pipe 360 and the copper pipe 350 may be welded. As a result, as shown in FIG. 4, the welding portion 370 may be formed between the copper-alloy stainless pipe 360 and the copper pipe 350 (S13).

Figure 6A:
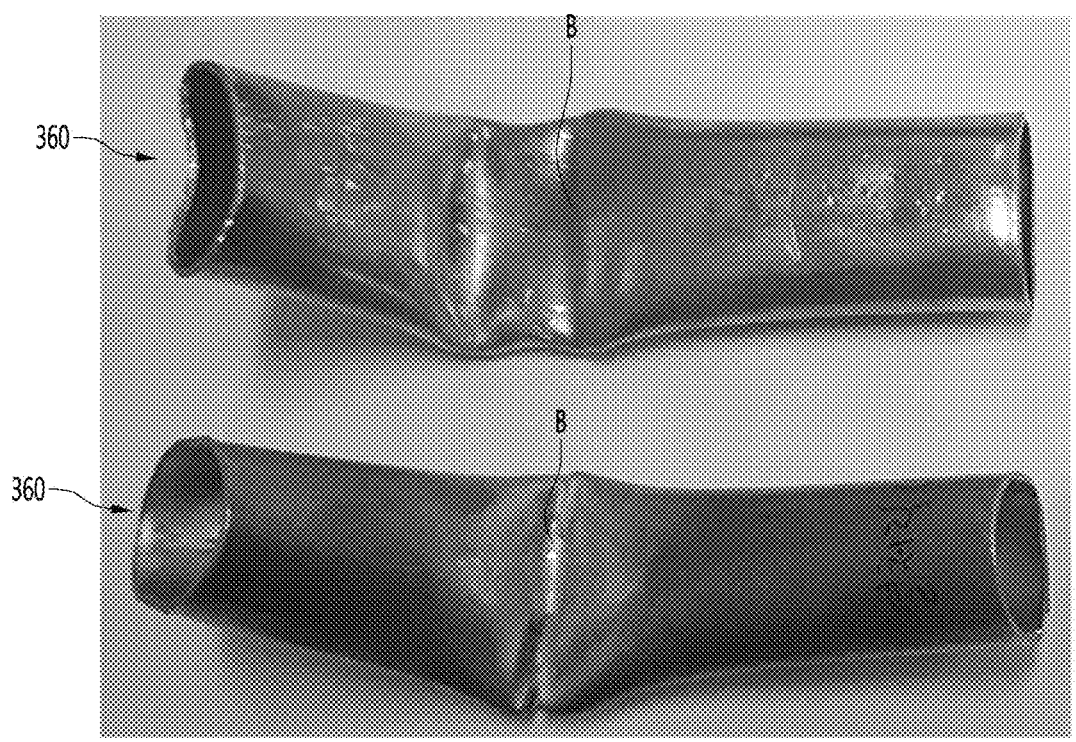
FIG. 6a is a photograph showing a first state of a bending test result of a copper-alloy stainless pipe according to an embodiment of the present invention.
Figure 6B:
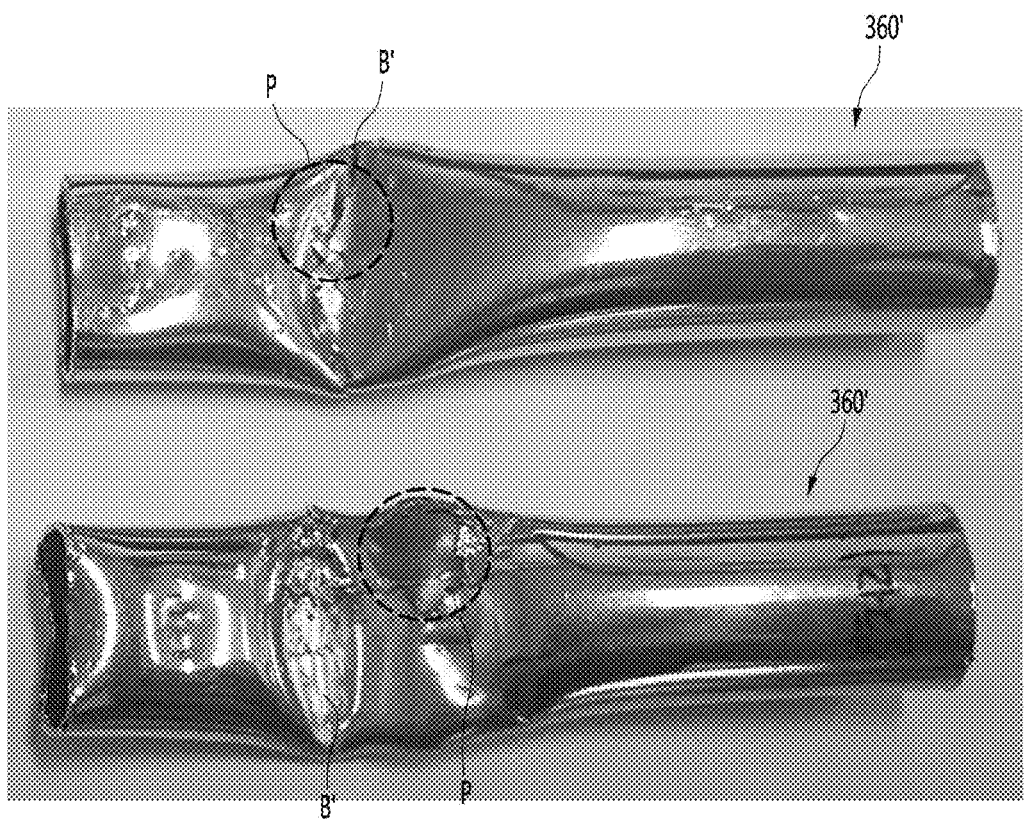
FIG. 6b is a photograph showing a first state of a bending test result of a conventional copper-plated stainless pipe.

FIG. 6a is a photograph showing a first state of a bending test result of a copper-alloy stainless pipe according to an embodiment of the present invention, and FIG. 6b is a photograph showing a first state of a bending test result of a conventional copper-plated stainless pipe.

FIG. 6a shows the state of the pipe 360 when a bending portion B is formed by repeatedly bending and unbending the copper-alloy stainless pipe 360 formed by the manufacturing method of FIG. 5 (bending test). Specifically, the pipe 360 was bent by 180 degrees and then was unbent.

The first photograph of FIG. 6a shows a result of repeatedly bending and unbending the pipe five times and the second photograph shows a result of repeatedly bending and unbending the pipe 10 times. As shown in the two photographs of FIG. 6a, it can be seen that the copper plating layer is stably bonded to the pipe base material through the recrystallization layer and thus the copper plating layer is not peeled off.

FIG. 6b shows the state of the pipe 360' in which only the copper plating layer is formed on the pipe base material, unlike the embodiment of the present invention. That is, the copper plating layer is relatively weakly ion-bonded to the pipe base material. Similar to the experiment, the state of the pipe 360' when the bending portion B' is formed by repeatedly bending and unbending the pipe 360' (bending test) is shown.

The first photograph of FIG. 6b shows a result of repeatedly bending and unbending the pipe five times and the second photograph shows a result of repeatedly bending and unbending the pipe 10 times. As shown in the two photographs of FIG. 6b, the pipe 360' includes a peeling portion P. The peeling portion P means a portion of the pipe base material, from which the copper plating layer is peeled off.

Since the pipe base material is exposed to the outside by the peeling portion P, the pipe 360' and the copper pipe 350 may not be easily welded. Corrosion resistance of the pipe may be reduced.

Figure 7A:
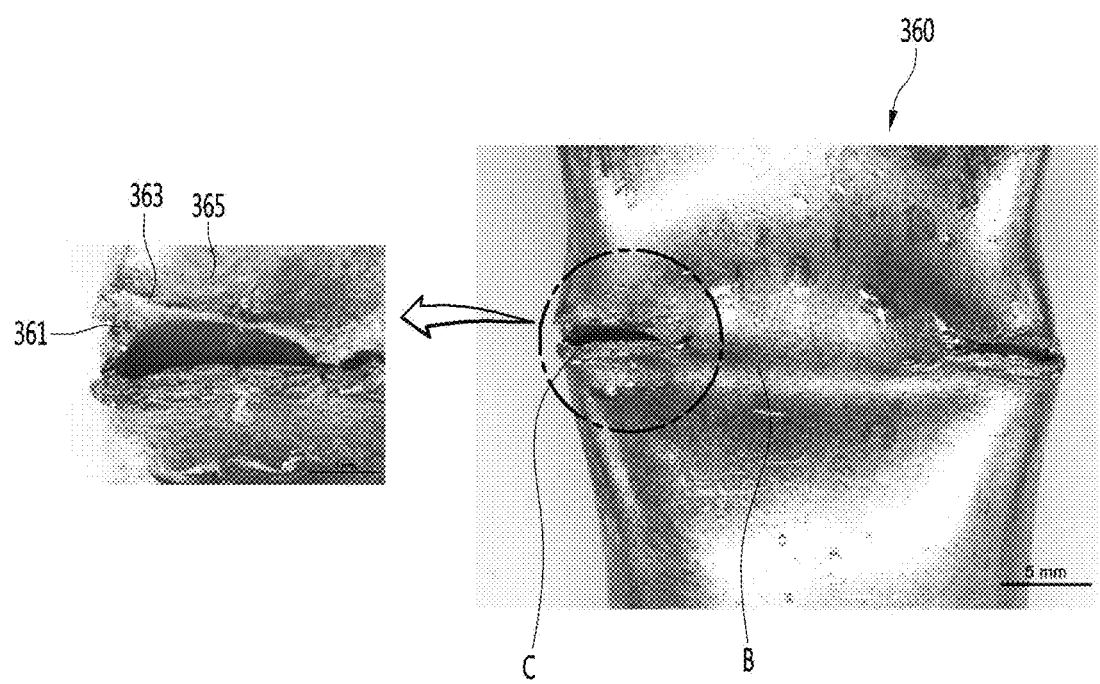
FIG. 7a is a photograph showing a second state of a bending test result of a copper-alloy stainless pipe according to an embodiment of the present invention.
Figure 7B:
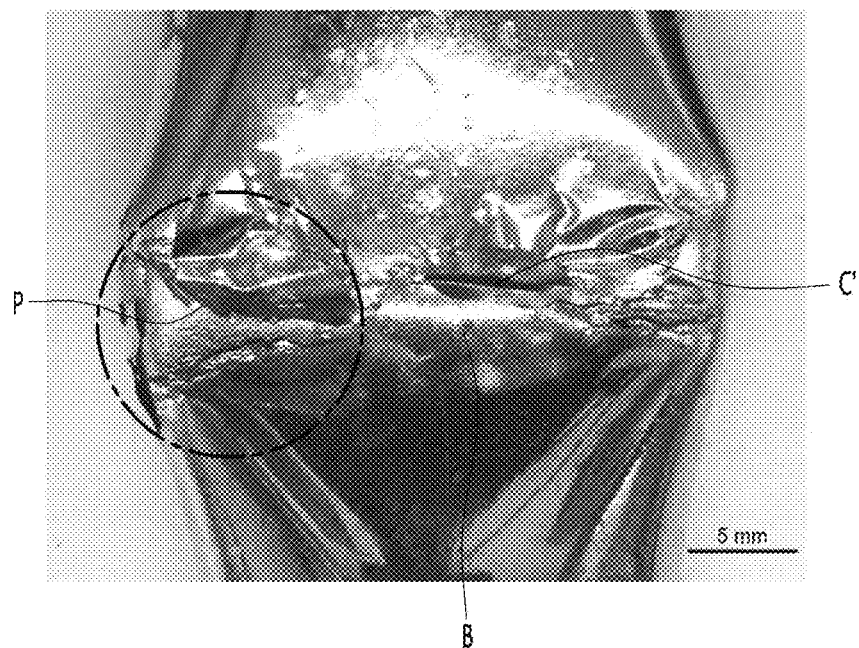
FIG. 7b is a photograph showing a first state of a bending test result of a conventional copper-plated stainless pipe.

FIG. 7a is a photograph showing a second state of a bending test result of a copper-alloy stainless pipe according to an embodiment of the present invention, and FIG. 7b is a photograph showing a first state of a bending test result of a conventional copper-plated stainless pipe. FIGS. 7a and 7b show the opposite sides of the pipe of FIGS. 6a and 6b.

Referring to FIG. 7a, a state in which a cut portion C of the pipe 360 is formed through the bending test of the copper-alloy stainless pipe 360 is shown. Specifically, it can be seen that the copper plating layer 365 is firmly bonded to the outer surface of the pipe base material 361 in the cut portion C of the pipe 360. The recrystallization layer 363 is formed between the pipe base material 361 and the copper plating layer 365.

Referring to FIG. 7b, a state in which a peeling portion P and a cut portion C' are formed in the pipe 360' through the bending test of the pipe 360'. Specifically, it can be seen that the copper plating layer is peeled off from the pipe base material in the cut portion C' of the pipe 360'. Similarly, it can be seen that the copper plating layer is peeled off from the pipe base material in the peeling portion P of the pipe 360'.

Figure 8A:
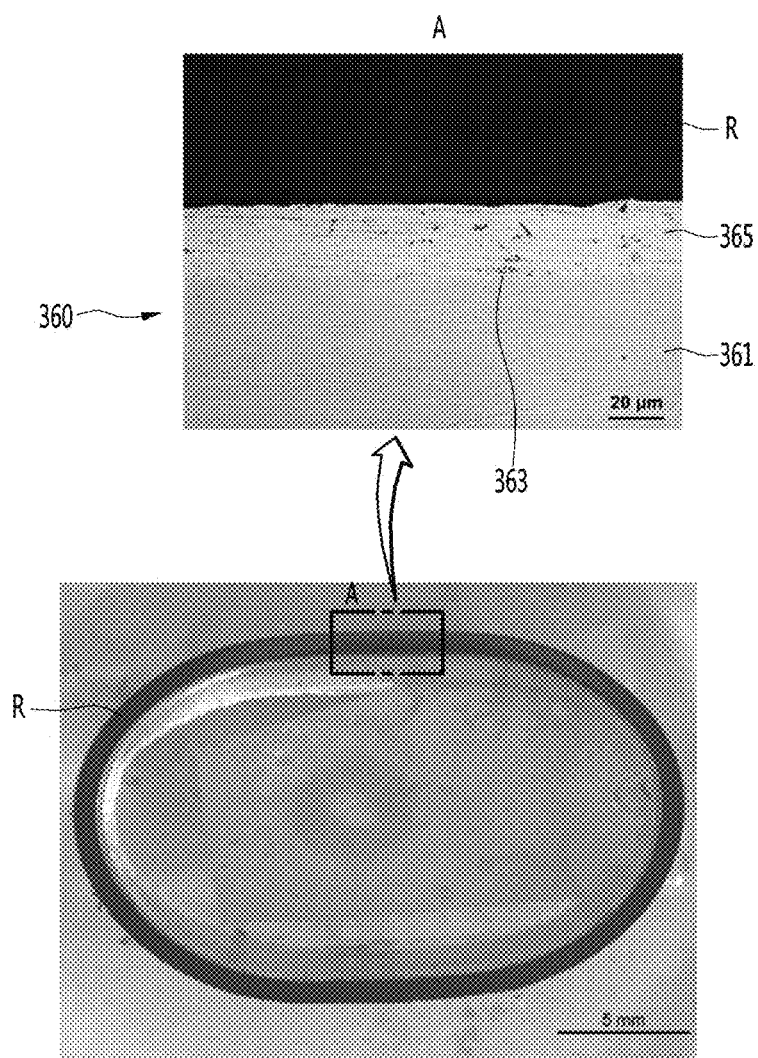
FIG. 8a is a photograph showing a state in which the cross section of a copper-alloy stainless pipe according to an embodiment of the present invention is magnified 500 times.
Figure 8B:
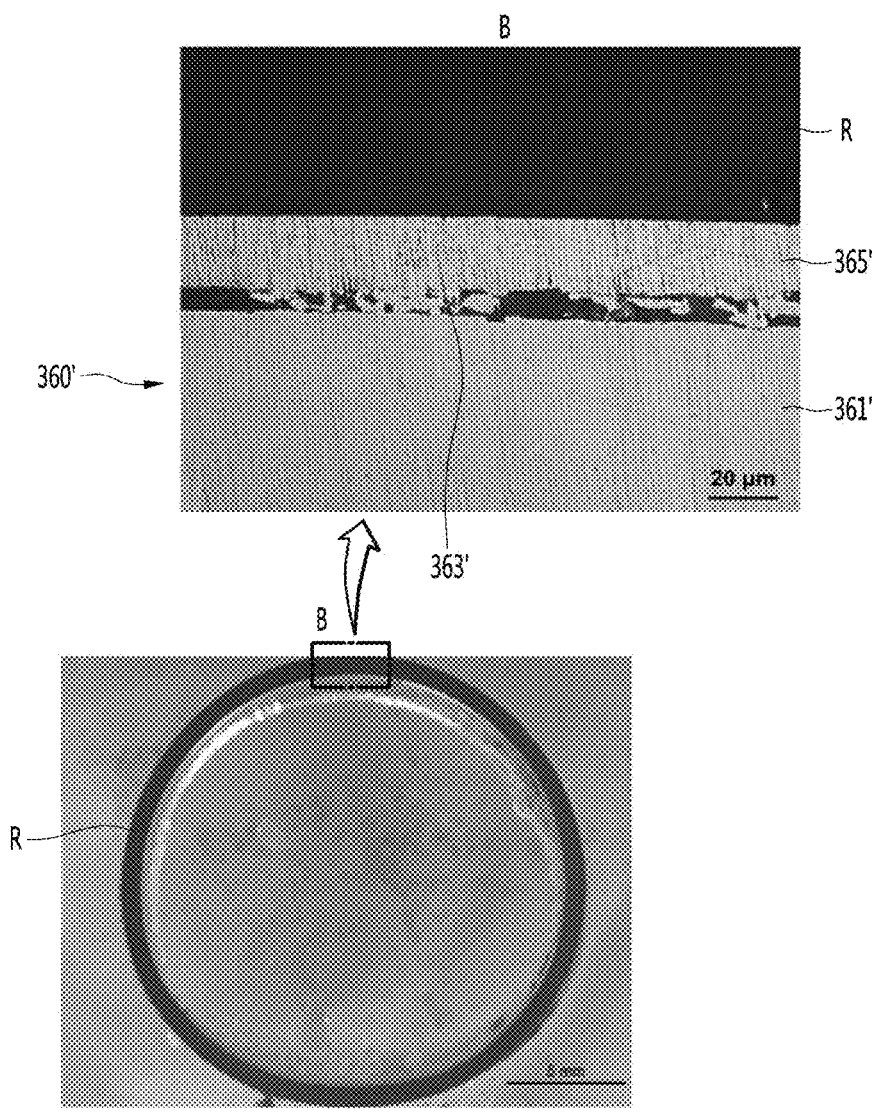
FIG. 8b is a photograph showing a state in which the cross section of a conventional copper-plated stainless pipe is magnified 500 times.

FIG. 8a is a photograph showing a state in which the cross section of a copper-alloy stainless pipe according to an embodiment of the present invention is magnified 500 times, and FIG. 8b is a photograph showing a state in which the cross section of a conventional copper-plated stainless pipe is magnified 500 times.

Referring to FIG. 8a, the cross section of the copper-alloy stainless pipe 360 according to the embodiment of the present invention includes a pipe base material 361 composed of ductile stainless steel, a copper plating layer 365 formed on the outer surface of the pipe base material 361, and a recrystallization layer 363 forming the interface between the pipe base material 361 and the copper plating layer 365.

As can be seen from the photograph of FIG. 8a, by forming the recrystallization layer 363, the copper plating layer 365 may not being separated from the pipe base material 361, thereby forming a good bonding interface. A black ring-shaped member shown in FIG. 8a is a reference ring R disposed to easily distinguish between layers when the cross-sectional photograph is enlarged.

In contrast, referring to FIG. 8b, the cross section of the pipe 360' obtained by coating the pipe base material with the copper plating layer without heat treatment includes a pipe base material 361', a copper plating layer 365' formed on the outer surface of the pipe base material 361', and a peeling portion 363' forming the interface between the pipe base material 361' and the copper plating layer 365'.

As can be seen from the photograph of FIG. 8b, the copper plating layer 365' covers the outer surface of the pipe base material 361' but is separated from the pipe base material 361' by the peeling layer 363'. Accordingly, in the case of the pipe 360' shown in FIG. 8b, the copper plating layer 365' is easily peeled off by external force and corrosion resistance is weak.

Figure 9A:
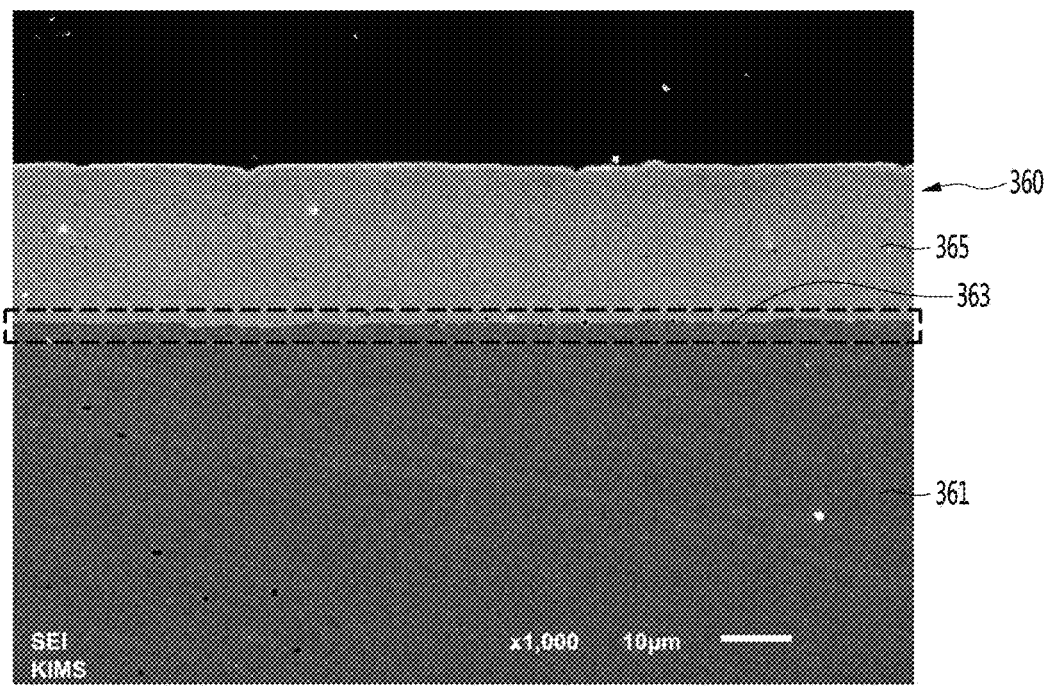
FIG. 9a is a photograph of the cross section of a copper-alloy stainless pipe according to an embodiment of the present invention taken using an SEM equipment.
Figure 9B:
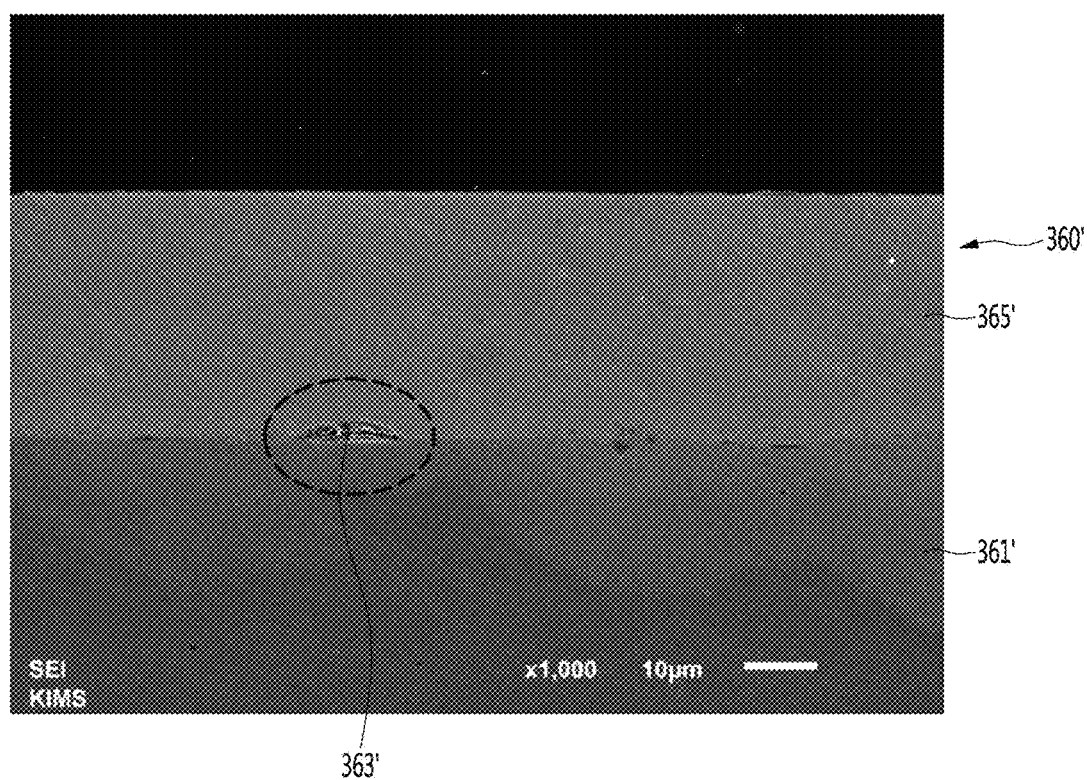
FIG. 9b is a photograph of the cross section of a conventional copper-plated stainless pipe taken using an EM equipment.

FIG. 9a is a photograph of the cross section of a copper-alloy stainless pipe according to an embodiment of the present invention taken using a scanning electron microscope (SEM) equipment, and FIG. 9b is a photograph of the cross section of a conventional copper-plated stainless pipe taken using an EM equipment.

FIGS. 9a and 9b show the photographs of the cross sections of the copper-alloy stainless pipe 360 and the conventional pipe 360' described in FIGS. 8a and 8b, which are magnified using the SEM.

Specifically, referring to FIG. 9a, the copper-alloy stainless pipe 360 includes a pipe base material 361, a copper plating layer 365 provided on the surface of the pipe base material 361, and a recrystallization layer 363 disposed between the pipe base material 361 and the copper plating layer 365 to form a good bonding interface therebetween.

In contrast, referring to FIG. 9b, the conventional pipe 360' includes a pipe base material 361', a copper plating layer 365' provided on the surface of the pipe base material 361', and a peeling layer 363' disposed between the pipe base material 361' and the copper plating layer 365'. The copper plating layer 365 is easily separated from the pipe base material 361' by the peeling layer 363'.

Figure 10:
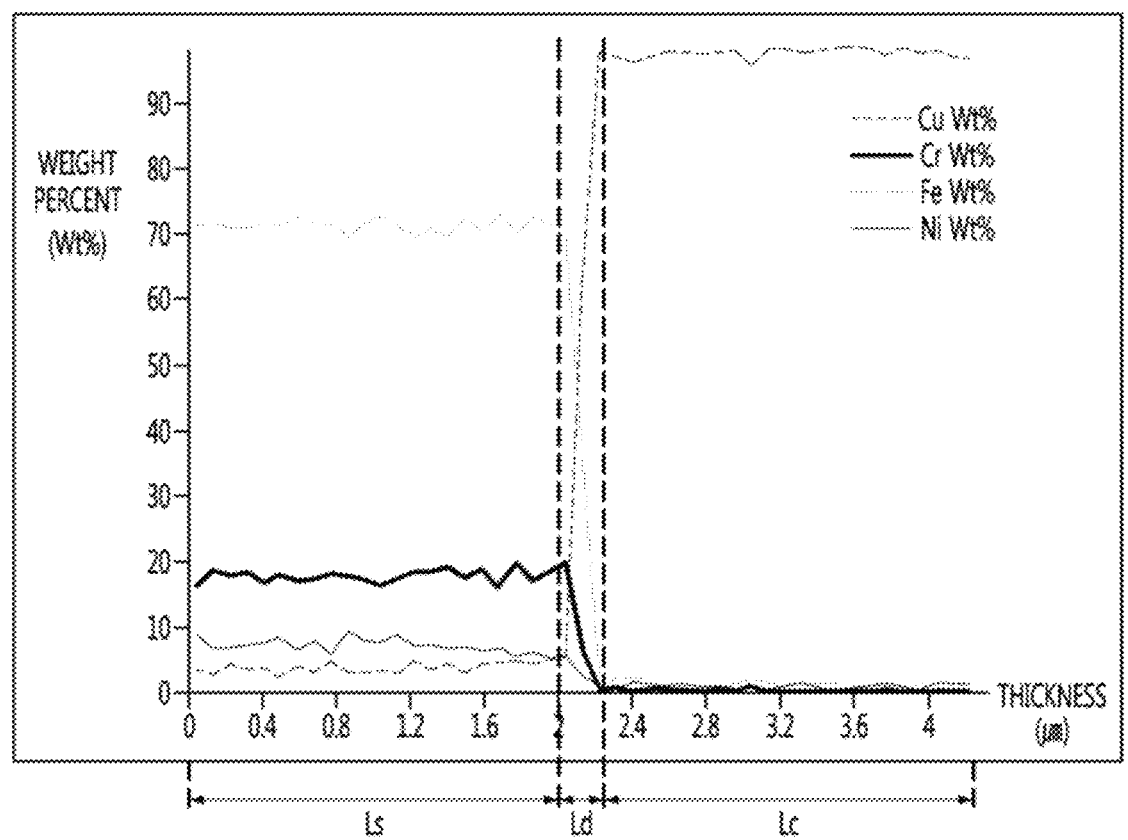
FIG. 10 is a graph showing a result of analyzing composition of a copper-alloy stainless pipe according to an embodiment of the present invention.

FIG. 10 is a graph showing a result of analyzing composition of a copper-alloy stainless pipe according to an embodiment of the present invention. FIG. 10 shows a result of performing energy dispersive spectrometry (EDS) analysis of the copper-alloy stainless pipe 360 using the SEM.

The abscissa of the graph shows the thickness (μm) of the pipe and the origin of the abscissa indicates one point of the inner circumferential surface of the pipe base material 361, Ls denotes the thickness of the pipe base material 361 in the radical direction, and Lc denotes the thickness of the copper plating layer in the radical direction.

The ordinate of the graph shows the weight percent (Wt. %) of a metal composition. Each of four lines of the graph represent the weight percent of each of copper Cu, chromium (Cr), iron (Fe) and nickel (Ni).

Accordingly, copper Cu, chromium (Cr), iron (Fe) and nickel (Ni) are mixed at an appropriate ratio in a portion corresponding to the thickness of the pipe base material 361 of the abscissa, that is, about 0 to 2 μm. In contrast, there are copper (Cu) and few other metals in a portion corresponding to the copper plating layer 365, that is, 2.2 to 4.2 μm.

A region, in which the four metal compositions (Cu, Cr, Fe and Ni) are changed, is formed in a region between the pipe base material 361 and the copper plating layer 365, that is, in 2 to 2.2 μm of the abscissa.

This region corresponds to a region which the recrystallization 363 is located and is a region in which, as the value of the abscissa increases, the weight percent of each of three metal compositions Cr, Fe and Ni linearly decreases and the weight percent of one metal composition Cu linearly increases from the pipe base material 361 toward the copper plating layer 361.

In summary, it can be seen that the recrystallization layer 363 forms a diffusion layer having a thickness of about 0.2 μm and, particularly, a thickness of 0.18 to 0.22 μm. By this diffusion layer, good bonding between the pipe base material 361 and the copper plating layer 365 may be achieved.

According to the present invention, a copper-alloy stainless pipe is configured to stably bond a copper plating layer to a surface of a base material composed of a stainless steel pipe.

In particular, it is possible to prevent a plating layer from being peeled off by forming a recrystallization layer between the plating layer and a surface of a base material through heat treatment after the surface of the base material is plated with copper.

In addition, since a heat treatment temperature for preventing intergranular corrosion of a stainless steel pipe is determined and heat treatment is performed at the determined heat treatment temperature, it is possible to easily form the recrystallization layer.

In addition, since a ductile stainless steel pipe having improved processability by securing the same ductility as a copper pipe may be used as a base material, it is possible to improve installation convenience of the refrigerant pipe.

In addition, since a stainless steel pipe having strength and hardness equal to or higher than those of a copper pipe is used as a base material, it is possible to increase reliability of the refrigerant pipe.

What is claimed is:

1. A copper-alloy stainless pipe comprising:
   a pipe base material composed of stainless steel;
   a copper plating layer disposed on an outer surface of the pipe base material; and
   a recrystallization layer composed of an intermetallic compound, the recrystallization layer forming an interface between the pipe base material and the copper plating layer,
   wherein the recrystallization layer is formed by performing heat treatment in a state in which the copper plating layer is disposed on the pipe base material,
   wherein the stainless steel has a ferrite matrix structure that is heat treated between 800° C. to 900° C.,
   wherein the stainless steel is composed of 0.03 wt. % or less of Carbon, greater than 0 to 1.7 wt. % or less of Silicon, 1.5 to 3.5 wt. % of Manganese, 15.0 to 18.0 wt. % of Chromium, 7.0 to 9.0 wt. % of Nickel, 1.0 to 4.0 wt. % of Copper, 0.03 wt. % or less of Molybdenum, 0.04 wt. % or less of Phosphorus, 0.04 wt. % or less of Sulfur and 0.03 wt. % or less of Nitrogen,
   wherein the intermetallic compound comprises copper (Cu), chromium (Cr), iron (Fe), and nickel (Ni),
   wherein a weight percent of chromium (Cr), iron (Fe) and nickel (Ni) in the recrystallization layer decreases in a direction from the pipe base material toward the copper plating layer, and
   wherein a weight percent of copper (Cu) in the recrystallization layer increases in a direction from the pipe base material toward the copper plating layer.

2. The copper-alloy stainless pipe of claim 1, wherein the weight percent of chromium (Cr), iron (Fe) and nickel (Ni) in the recrystallization layer linearly decreases in the direction from the pipe base material toward the copper plating layer.

3. The copper-alloy stainless pipe of claim 1, wherein the weight percent of copper (Cu) in the recrystallization layer linearly increases in the direction from the pipe base material toward the copper plating layer.

4. The copper-alloy stainless pipe of claim 1, wherein a thickness of the recrystallization layer in a radial direction is 0.18 μm to 0.22 μm.

5. The copper-alloy stainless pipe of claim 1, wherein the copper plating layer is composed of copper cyanide or copper sulfate.

6. The copper-alloy stainless pipe of claim 5, wherein a thickness of the copper plating layer in a radial direction is 3 μm to 30 μm.

7. The copper-alloy stainless pipe of claim 5, wherein a thickness of the copper plating layer in a radial direction is 3 μm to 5 μm.

8. An air conditioner comprising a compressor, an outdoor unit including a suction pipe connected to an inlet side of the compressor and a discharge pipe connected to an outlet side of the compressor, and an indoor unit connected to the outdoor unit,
   wherein the suction pipe or the discharge pipe comprises a copper-alloy stainless pipe welded to a copper pipe,
   wherein the copper-alloy stainless pipe comprises:
   a pipe base material composed of stainless steel;
   a copper plating layer disposed on an outer surface of the pipe base material; and
   a recrystallization layer composed of intermetallic compound, the recrystallization layer forming an interface between the pipe base material and the copper plating layer,
   wherein the recrystallization layer is formed by performing heat treatment in a state in which the copper plating layer is disposed on the pipe base material,
   wherein the stainless steel has a ferrite matrix structure that is heat treated between 800° C. to 900° C.,
   wherein the stainless steel is composed of 0.03 wt. % or less of Carbon, greater than 0 to 1.7 wt. % or less of Silicon, 1.5 to 3.5 wt. % of Manganese, 15.0 to 18.0 wt. % of Chromium, 7.0 to 9.0 wt. % of Nickel, 1.0 to 4.0 wt. % of Copper, 0.03 wt. % or less of Molybdenum, 0.04 wt. % or less of Phosphorus, 0.04 wt. % or less of Sulfur and 0.03 wt. % or less of Nitrogen,
   wherein the intermetallic compound comprises copper (Cu), chromium (Cr), iron (Fe), and nickel (Ni),
   wherein a weight percent of chromium (Cr), iron (Fe) and nickel (Ni) in the recrystallization layer decreases in a direction from the pipe base material toward the copper plating layer, and
   wherein a weight percent of copper (Cu) in the recrystallization layer increases in a direction from the pipe base material toward the copper plating layer.

9. The air conditioner of claim 8,
   wherein the copper-alloy stainless pipe is bonded to an inside surface of the copper pipe, and
   wherein a welding portion is formed between the copper-alloy stainless pipe and the copper pipe.

10. The air conditioner of claim 9, wherein the welding portion comprises a filler metal.

11. A method of manufacturing a copper-alloy stainless pipe comprising:
    plating an outer surface of a pipe base material composed of stainless steel with copper to form a copper plating layer; and
    performing a recrystallization process of the pipe base material and the copper playing layer by heat treating the pipe base material and the copper plating layer to form a recrystallization layer between the pipe base material and the copper plating layer,
    wherein the recrystallization layer is formed by performing heat treatment in a state in which the copper plating layer is disposed on the pipe base material,
    wherein the stainless steel has a ferrite matrix structure that is heat treated between 800° C. to 900° C.,
    wherein the stainless steel is composed of 0.03 wt. % or less of Carbon, greater than 0 to 1.7 wt. % or less of Silicon, 1.5 to 3.5 wt. % of Manganese, 15.0 to 18.0 wt. % of Chromium, 7.0 to 9.0 wt. % of Nickel, 1.0 to 4.0 wt. % of Copper, 0.03 wt. % or less of Molybdenum, 0.04 wt. % or less of Phosphorus, 0.04 wt. % or less of Sulfur and 0.03 wt. % or less of Nitrogen,
    wherein the intermetallic compound comprises copper (Cu), chromium (Cr), iron (Fe), and nickel (Ni),
    wherein a weight percent of chromium (Cr), iron (Fe) and nickel (Ni) in the recrystallization layer decreases in a direction from the pipe base material toward the copper plating layer, and
    wherein a weight percent of copper (Cu) in the recrystallization layer increases in a direction from the pipe base material toward the copper plating layer.

12. The method of claim 11, wherein the copper-alloy stainless pipe is welded to a copper pipe to form a refrigerant pipe.

13. The method of claim 11, wherein the heat treating is performed for a set time of 10 to 20 minutes.

* * * * *